(12) United States Patent
Baba et al.

(10) Patent No.: US 10,749,392 B2
(45) Date of Patent: Aug. 18, 2020

(54) MOTOR ROTOR, MOTOR, BLOWER, AND REFRIGERATION AIR CONDITIONER

(71) Applicant: Mitsubishi Electric Corporation, Tokyo (JP)

(72) Inventors: Kazuhiko Baba, Tokyo (JP); Koji Yabe, Tokyo (JP); Hiroshi Yamanaka, Tokyo (JP); Hironori Yabuuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 164 days.

(21) Appl. No.: 15/745,464

(22) PCT Filed: Aug. 5, 2015

(86) PCT No.: PCT/JP2015/072268
§ 371 (c)(1),
(2) Date: Jan. 17, 2018

(87) PCT Pub. No.: WO2017/022107
PCT Pub. Date: Feb. 9, 2017

(65) Prior Publication Data
US 2018/0212483 A1 Jul. 26, 2018

(51) Int. Cl.
*H02K 1/30* (2006.01)
*H02K 1/27* (2006.01)

(52) U.S. Cl.
CPC ............ *H02K 1/276* (2013.01); *H02K 1/278* (2013.01); *H02K 1/30* (2013.01)

(58) Field of Classification Search
CPC .................. H02K 1/276; H02K 1/30
(Continued)

(56) References Cited

U.S. PATENT DOCUMENTS 3,873,861 A * 3/1975 Halm ............... H02K 1/185
                                                310/43
6,359,359 B1 3/2002 Miura et al.
(Continued)

FOREIGN PATENT DOCUMENTS

CN 200990537 Y 12/2007
CN 101442229 A 5/2009
(Continued)

OTHER PUBLICATIONS

Office action dated Oct. 2, 2018 issued in corresponding JP patent application No. 2017-532325 (and English machine translation thereof).
(Continued)

*Primary Examiner* — Terrance L Kenerly
(74) *Attorney, Agent, or Firm* — Posz Law Group, PLC

(57) ABSTRACT

A motor rotor includes: a shaft; a smaller-radius iron core fixedly attached to an outer peripheral surface of the shaft; a larger-radius iron core disposed spaced apart from the smaller-radius iron core in a radial direction perpendicular to an axis of the shaft, which is formed in a ring shape in cross section by a combination of a plurality of iron core blocks, and disposed to share a common axis with the smaller-radius iron core; and an insulating resin portion used to fix the smaller-radius iron core and the larger-radius iron core. The larger-radius iron core and the smaller-radius iron core are formed of their respective different materials. The material forming the larger-radius iron core has an iron loss less than an iron loss of the material forming the smaller-radius iron core.

12 Claims, 11 Drawing Sheets

(58) Field of Classification Search
USPC .................................................. 310/12.25
See application file for complete search history.

(56) References Cited

U.S. PATENT DOCUMENTS

| | | | |
|---|---|---|---|
| 6,800,967 B2 | 10/2004 | Oshima et al. | |
| 2003/0020337 A1* | 1/2003 | Joachim ............... | F16F 15/126 310/51 |
| 2004/0135528 A1* | 7/2004 | Yasohara ......... | H03K 17/04123 318/400.26 |
| 2008/0143198 A1* | 6/2008 | Bi .......................... | H02K 1/187 310/51 |
| 2013/0119806 A1* | 5/2013 | Watanabe ............ | H02K 5/1732 310/156.01 |

FOREIGN PATENT DOCUMENTS

| | | |
|---|---|---|
| JP | 50-150701 U | 12/1975 |
| JP | H11-004555 A | 1/1999 |
| JP | 2000-228838 A | 8/2000 |
| JP | 2000-324736 A | 11/2000 |
| JP | 2001-268831 A | 9/2001 |
| JP | 2003-061279 A | 2/2003 |
| JP | 2004-007937 A | 1/2004 |
| JP | 2005-098642 A | 4/2005 |
| JP | 2005-198365 A | 7/2005 |
| JP | 2006-158037 A | 6/2006 |
| JP | 2006-217741 A | 8/2006 |
| JP | 2009-130966 A | 6/2009 |
| JP | 2010-166689 A | 7/2010 |
| JP | 2010-183692 A | 8/2010 |
| JP | 2012-105482 A | 5/2012 |
| JP | 2015-106928 A | 6/2015 |
| WO | 01/95460 A1 | 12/2001 |
| WO | 2012/120828 A1 | 9/2012 |

OTHER PUBLICATIONS

Office Action dated Mar. 12, 2019 issued in corresponding CN patent application No. 201580082057.3 (and English translation).
International Search Report of the International Searching Authority dated Oct. 27, 2015 for the corresponding international application No. PCT/JP2015/072268 (and English translation).
Office Action dated Aug. 19, 2019 issued in corresponding CN patent application No. 201580082057.3 (and English translation).
Office Action dated Mar. 16, 2020 issued in corresponding CN patent application No. 201580082057.3 (and English translation).

* cited by examiner

MOTOR ROTOR, MOTOR, BLOWER, AND REFRIGERATION AIR CONDITIONER

CROSS REFERENCE TO RELATED APPLICATION

This application is a U.S. national stage application of International Patent Application No. PCT/JP2015/072268 filed on Aug. 5, 2015, the disclosure of which is incorporated herein by reference.

TECHNICAL FIELD

The present invention relates to a rotor for an electric motor that rotates using a magnetic field induced by a current flowing through a coil wound on a stator, an electric motor, a blower, and a refrigeration air conditioner.

BACKGROUND

Patent Literature 1 discloses a rotor of a motor, which is a rotor for an inner rotary type motor, including an outer core facing an inner periphery of a stator and forming a magnetic path of the stator necessary for rotation, an inner core fixedly attached to a shaft to transmit rotational force to the shaft, and an elastic material such as a rubber material with which a gap between the outer core and the inner core is filled. The motor rotor described in Patent Literature 1 has a plurality of projections facing each other on an inner periphery side of the outer core and on an inner periphery side of the inner core, and at least one of the projection of the outer core and the projection of the inner core is covered with the elastic material such as a rubber material.

PATENT LITERATURE

Patent Literature 1: Japanese Patent Application Laid-open No. 2003-061279

For the motor rotor described in Patent Literature 1, when the outer core and the inner core are manufactured by stacking a number of sheet materials, sheet materials constituting the outer core and the inner core are, in general, manufactured by performing press work on one and the same plate material from a stand point of higher productivity. For the motor stator, if the sheet materials constituting the outer core and the inner core are manufactured by such pressing of the single plate material, some portion of the plate material situated between a sheet material for constituting the inner core and a sheet material for constituting the outer core becomes waste material, thereby possibly leading to a low yield of material, and hence a large increase in cost.

In addition, for the motor rotor described in Patent Literature 1, when the inner core and the outer core are different in a relevant axial direction, if the sheet materials constituting the outer core and the inner core are manufactured by such pressing of the single plate material, a sheet material for forming the core having a smaller axial length becomes redundant, thereby leading to an increase in material cost. Moreover, for the motor rotor described in Patent Literature 1, if the sheet materials constituting the outer core and the inner core by pressing of different plate materials, some inner portion of each sheet material for forming the outer core becomes waste material, thereby possibly leading to an increase in material cost.

Furthermore, in order to improve the yield of material of the plate material, it is assumed that a motor rotor may be configured such that an inner core that does not form a magnetic path is formed of an injection-molded product of a resin, an aluminum die-casting product, or green compact. A motor rotor that is formed using an injection-molded product of a resin, an aluminum die-casting product, or green compact has an improved yield of material. However, such a motor rotor has need of increasing the axial length of the inner core to ensure a fastening power for attachment to the shaft, thereby leading to an increase in material cost, and a large increase in total cost.

SUMMARY

The present invention has been made in view of the foregoing, and an object of the present invention is to provide a motor rotor that can realize cost reduction.

In order to the above-mentioned problems and achieve the object, the present invention provides a rotor of an electric motor comprising: a shaft; a first core fixed to an outer circumferential surface of the shaft; a second core formed in a ring shape by combining a plurality of core blocks, disposed in a radial direction orthogonal to an axis of the shaft to be spaced apart from the first core, and disposed in a position having an axis common to the first core; and insulating resin that fixes the first core and the second core to each other.

The motor rotor according to the present invention is advantageous in that cost reduction can be realized.

DETAILED DESCRIPTION

A motor rotor, a motor, and a refrigeration air conditioner according to each embodiment of the present invention will be described below with reference to the drawings. Note that the present invention is not necessarily limited by these embodiments.

First Embodiment

Figure 1:
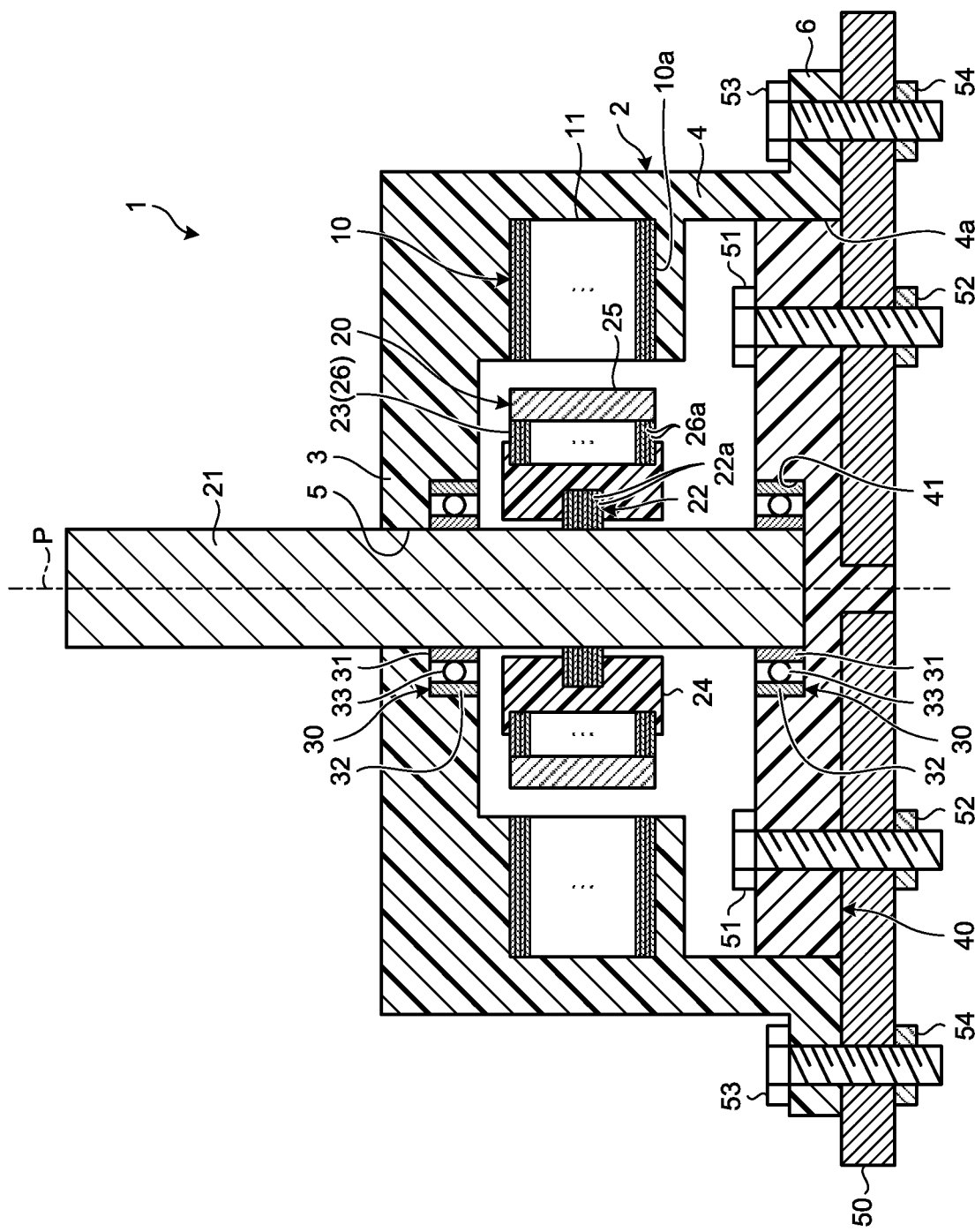
FIG. 1 is a longitudinal cross-sectional view of a motor according to a first embodiment of the present invention.
Figure 2:
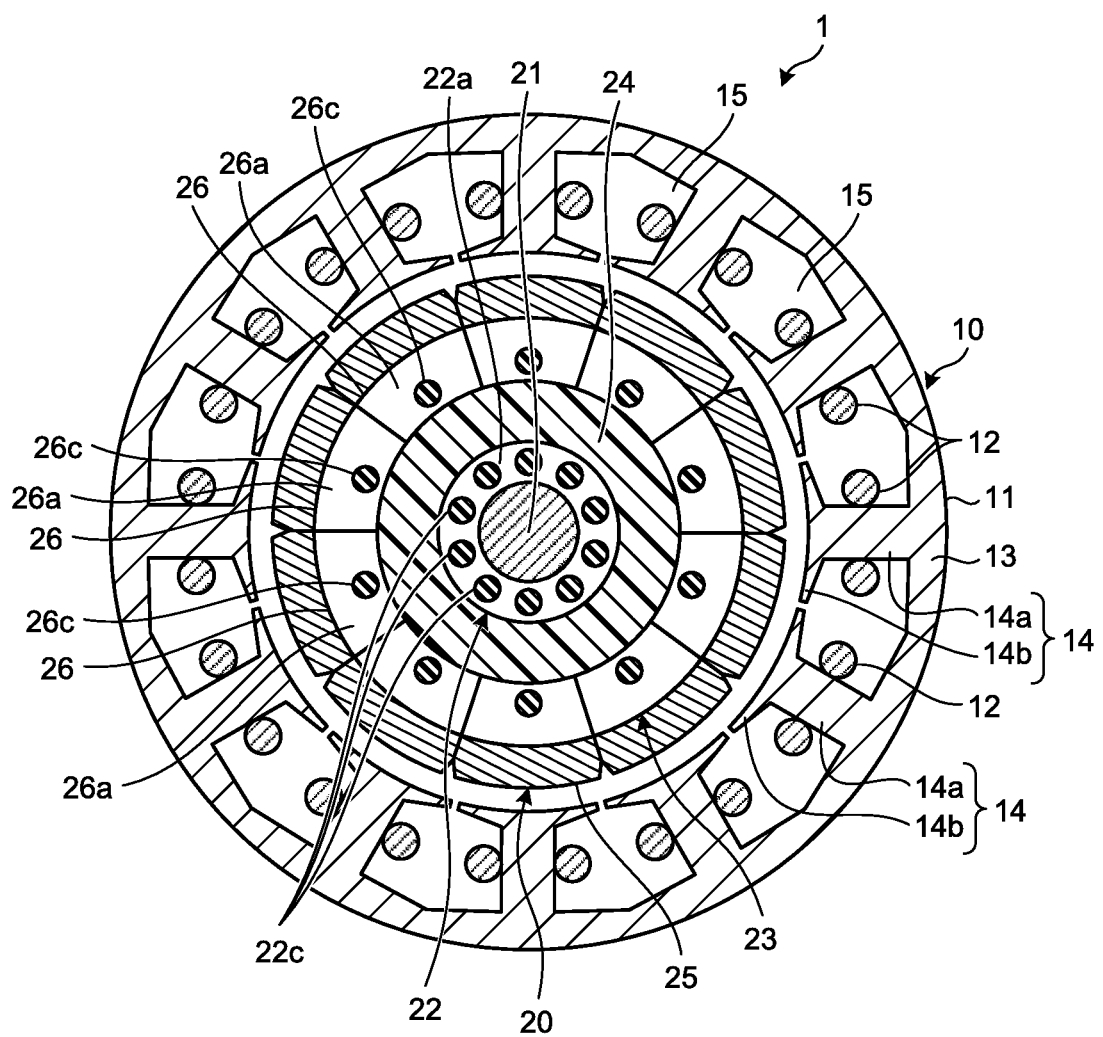
FIG. 2 is a transverse cross-sectional view, viewed perpendicularly to a shaft, of a stator and a rotor of the motor illustrated in FIG. 1.
Figure 3:
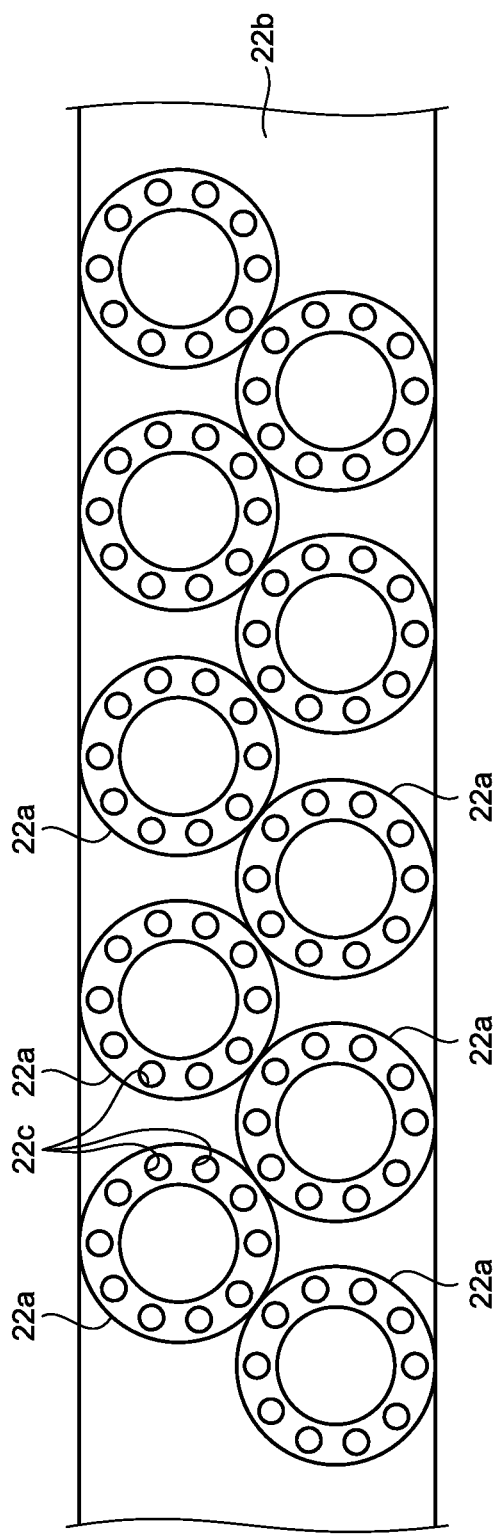
FIG. 3 is a plan view illustrating a metal bar material for forming sheet materials that constitute a smaller-radius iron core of the motor illustrated in FIG. 1.
Figure 4:
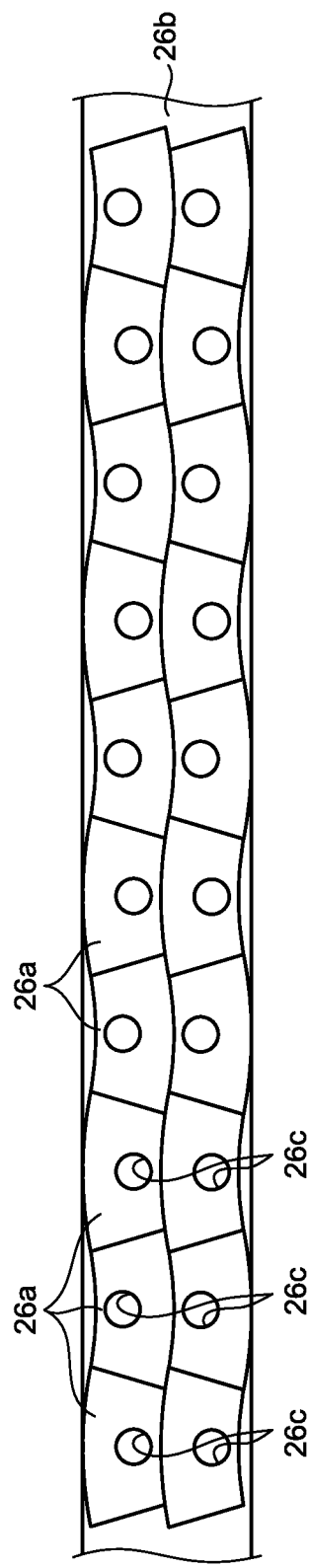
FIG. 4 is a plan view illustrating a metal bar material for forming sheet materials that constitute a larger-radius iron core of the motor illustrated in FIG. 1.

FIG. 1 is a longitudinal cross-sectional view of a motor according to a first embodiment of the present invention. FIG. 2 is a transverse cross-sectional view, viewed perpendicularly to a shaft, of a stator and a rotor of the motor illustrated in FIG. 1. FIG. 3 is a plan view illustrating a metal bar material for forming sheet materials that constitute a smaller-radius iron core of the motor illustrated in FIG. 1. FIG. 4 is a plan view illustrating a metal bar material for forming sheet materials that constitute a larger-radius iron core of the motor illustrated in FIG. 1.

As illustrated in FIG. 1, a motor 1 includes: a stator 10, which is annular in cross section, formed integrally with a resin mold 2 formed from a thermosetting resin; and a rotor 20 disposed on the inner side of the stator 10 through the intermediary of a gap from the stator 10. The motor 1 also includes: a pair of bearings 30 rotatably supporting a shaft 21 of the rotor 20; an insulating bracket 40 fixedly disposed on an inner side of an opening mouth 4a of the resin mold 2; and a bracket 50 fixedly attached to the insulating bracket 40.

As illustrated in FIG. 2, the stator 10 includes a stator iron core 11 which is annular in cross section, and coils 12 wound on the stator iron core 11. The stator iron core 11 is constructed by punching a number of electromagnetic steel sheets one by one, and stacking a number of electromagnetic steel sheets obtained by the punching. An electromagnetic steel sheet typically has a thickness in a range from 0.2 mm to 0.5 mm. The stator iron core 11 includes a yoke 13, which is annular in cross section, and twelve teeth 14 arranged on an inner side of the yoke 13, at equally-spaced intervals in a circumferential direction about an axis of the yoke 13. Between first teeth 14 and second teeth 14 adjacent to teak other in the circumferential direction of the yoke 13, a slot 15 is formed, which is a space delimited by the yoke 13 and the adjacent teeth 14. In the first embodiment, the number of the slots 15 is 12, but the number of the slots 15 is not limited to 12.

The teeth 14 include: a base portion 14a protruding inward from the yoke 13 in the radial direction of the yoke 13, and having a width constant in the direction perpendicular to the radial direction of the yoke 13; and an end portion 14b provided on an inner side of the base portion 14a, and having a width greater than the width of the base portion 14a, the width being a dimension in the direction perpendicular to the radial direction of the yoke 13. That is, the base portion 14a extends in the radial direction of the yoke 13, and has a width constant in the radial direction. The end portion 14b has a flanged or umbrella-like shape, and protrudes from the base portion 14a in both sides thereof in the circumferential direction of the yoke 13. The end portion 14b is symmetric in cross section about the radial direction of the yoke 13. Thus, by the stator 10 having the end portion 14b being in a flanged or umbrella-like shape, magnetic force of a permanent magnet 25 of the rotor 20 can be effectively interlinked with the teeth 14 thus to improve the torque.

The coil 12 is formed with a wire being wound on a tooth 14. The coil 12 is resultant obtained by subjection a wire to concentrated winding. That is, each of the coils 12 is formed by winding a wire directly around the base portion 14a of the teeth 14. Although the first embodiment is directed to an example of the coils 12 being configured in a three-phase delta connection, the connection configuration is not limited thereto. Note that FIG. 2 omits to illustrate individual cross sections of windings of the coil 12, but illustrates the windings of the coil 12 in an integrated fashion. Although the first embodiment is directed to an example of the coils 12 being concentrated-winding coils, the coils 12 are not limited thereto, and may also be distributed-winding coils.

The resin mold 2 is formed of a bulk molding compound (BMC) that is a thermosetting resin. The resin mold 2 monolithically has a plate portion 3 having a disk shape, and a cylinder portion 4 having a cylindrical shape, which is connected with an outer peripheral portion of the plate portion 3. The plate portion 3 has a shaft through-hole 5 the shaft 21 of the rotor 20 penetrates rotatably. The cylinder portion 4 surrounds the outer periphery of the yoke 13. The cylinder portion 4 includes a flanged portion 6 which overlays the bracket 50 and is secured on the bracket 50 by bolts 53 and nuts 54.

The rotor 20 includes: a shaft 21 fixedly disposed at the center of the rotor 20; a smaller-radius iron core 22 (first iron core) fixedly attached to an outer peripheral surface of the shaft 21; a larger-radius iron core 23 (second iron core) disposed spaced apart from the smaller-radius iron core 22 in the radial direction perpendicular to an axis P of the shaft 21; an insulating resin portion 24 used to fix the smaller-radius iron core 22 and the larger-radius iron core 23; and a permanent magnet 25 fixedly attached to an outer peripheral surface of the larger-radius iron core 23.

The shaft 21 is disposed coaxially with the axis of the stator 10. The shaft 21 is a cylindrical member. The smaller-radius iron core 22, the larger-radius iron core 23, and the insulating resin portion 24 of the rotor 20 are fixedly disposed with respect to the shaft 21. The rotor 20 is configured to have a gap with the stator 10, and be rotatable about an axis of the shaft 21. The gap size is typically, for example, in a range from 0.3 mm to 1 mm, but is not limited to this range.

The smaller-radius iron core 22 fixed on the shaft 21 is formed in a ring shape in cross section. The smaller-radius iron core 22 is constructed of a plurality of sheet materials 22a illustrated in FIG. 3, which are stacked along the axial direction of the shaft 21. The said axial direction is parallel to the axis P of the shaft 21, and is also a direction in which the shaft 21 extends. The sheet materials 22a illustrated in FIG. 3 are formed by pressing. As illustrated in FIG. 3, the sheet materials 22a are produced by pressing a metal bar material 22b having a strip shape. The areas that will become the sheet materials 22a are in contact with each other at portions of the outer circumferences thereof, and two or more areas for the materials 22a are arranged in both of a longitudinal direction and a widthwise direction of the metal bar material 22b.

The smaller-radius iron core 22 has ten holes 22c for fixing the smaller-radius iron core 22 to the larger-radius iron core 23 using a resin material that forms the insulating resin portion 24. The holes 22c are formed at equal intervals in the circumferential direction about the shaft 21. The smaller-radius iron core 22 is fixedly disposed around the shaft 21 by press-fitting and shrink-fitting. Alternatively, the smaller-radius iron core 22 may be fixed around the shaft 21 by means of adhesive. The smaller-radius iron core 22 is fixed to the outer peripheral surface of the shaft 21, and thereby disposed coaxially with the shaft 21. The said phrase "disposed coaxially" means that an object is placed to share a common axis. In the first embodiment, a planar shape of an outer circumference of the smaller-radius iron core 22 viewed in the axial direction thereof is a true circle. However, a planar of the outer circumference is not limited to a true circle.

The larger-radius iron core 23 is formed in a ring shape in cross section having an inner diameter larger than the outer diameter of the smaller-radius iron core 22. The larger-radius iron core 23 is disposed through the intermediary of a gap from the smaller-radius iron core 22 in the radial direction perpendicular to the axis P of the shaft 21. As used in the first embodiment, the term "ring shape" refers not only to a circularly annular shape, but may also refer to a shape such that at least one of the cross-sectional shape of the inner peripheral surface and the cross-sectional shape of the outer peripheral surface is polygonal.

The larger-radius iron core 23 is formed in a ring shape in cross section by a combination of a plurality of iron core blocks 26 arranged around the shaft 21. The smaller-radius iron core 22 is disposed on an inner side of the larger-radius iron core 23. The larger-radius iron core 23 is disposed coaxially with the smaller-radius iron core 22. The iron core block 26 of the larger-radius iron core 23 is constructed of a plurality of sheet materials 26a illustrated in FIG. 4, which are stacked in the axial direction of the shaft 21. The sheet materials 26a illustrated in FIG. 4 are formed by pressing. As illustrated in FIG. 4, the sheet materials 26a are produced by pressing a metal bar material 26b having a strip shape. The areas that will become the sheet materials 26a are in contact with each other at portions of the outer circumferences thereof, and two or more thereof are arranged in both of the longitudinal direction and the widthwise direction of the metal bar material 26b.

Similarly to the smaller-radius iron core 22, the larger-radius iron core 23 formed in a ring shape in cross section by a combination of the plurality of iron core blocks 26 disposed around the shaft 21 has ten holes 26c formed at equal intervals in the circumferential direction about the axis P. The outer peripheral surface of the larger-radius iron core 23 has a shape of true circle in cross section perpendicular to the axis P. That is, a shape in cross section perpendicular to the axis P, of the outer peripheral surface of the larger-radius iron core 23 is a true circle. Although the first embodiment is directed to an example of the iron core blocks 26 each having one hole 26c, the number of the holes 26c in each iron core block 26 is not limited to one. In the first embodiment, the iron core blocks 26 are each formed in a sector shape in cross section viewed in the axial direction, the sector shape being a part of the ring shape in the circumferential direction about the axis of the ring shape.

In the first embodiment, material forming the larger-radius iron core 23 and material forming the smaller-radius iron core 22 are different, and the material forming the larger-radius iron core 23 has an iron loss less than an iron loss of the material forming the smaller-radius iron core 22. As a material for forming the larger-radius iron core 23, an electromagnetic steel sheet can be used. The sheet material 26a for forming the larger-radius iron core 23 is formed from a non-oriented electromagnetic steel sheet having a thickness of 0.5 mm or less. An iron loss value of the electromagnetic steel sheet forming the larger-radius iron core 23 is W15/50 (iron loss value under the condition of 1.5 T and 50 Hz) of 3 W or less. For the sheet materials 26a forming the larger-radius iron core 23, JN CORE (product name), JNE CORE (product name), or JNEH CORE (product name) manufactured by JFE Steel Corporation can be used, but the materials 26a is not limited to these products, and may be other electromagnetic steel sheet defined in Japanese Industrial Standard (JIS) C2552.

Materials constituting the smaller-radius iron core 22 are each formed of a cost-reducible material having an iron loss higher than materials constituting the larger-radius iron core 23. As a material for forming the smaller-radius iron core 22, a cold-rolled steel sheet defined in JIS (Japanese Industrial Standard) G3141 can be used. The sheet materials 22a constituting the smaller-radius iron core 22 are each formed from a cold-rolled steel sheet defined in JIS (Japanese Industrial Standard) G3141. As the sheet materials 22a constituting the smaller-radius iron core 22, an SPCC, SPCCT, SPCD, or SPCE material can be used.

In the first embodiment, the smaller-radius iron core 22 has a length in an axial direction of the shaft 21 shorter than a length of the larger-radius iron core 23 in an axial direction of the shaft 21. In the first embodiment, the rotor 20 is configured such that the larger-radius iron core 23 that forms a magnetic path has an axial length equal to the axial length of the permanent magnet 25, and the smaller-radius iron core 22 has an axial length shorter than the axial length of the larger-radius iron core 23 within a permissible range of strength thereof.

The permanent magnets 25 are fixedly attached to the outer peripheral surface of the larger-radius iron core 23 by means of adhesive. The permanent magnets 25 are fixedly attached to the outer peripheral surfaces of the iron core blocks 26 of the larger-radius iron core 23 to form a ring shape in cross section. In the first embodiment, there are provided ten permanent magnets 25, the number of which is equal to the number of the iron core blocks 26. Each of the permanent magnets 25 is fixedly attached to a corresponding one of the iron core blocks 26 by means of adhesive. The permanent magnets 25 are fixedly attached to the iron core blocks 26 to form a magnetic path with the larger-radius iron core 23. In addition, a length of the permanent magnets 25 in an axial direction of the shaft 21 is equal to a length of the larger-radius iron core 23 in an axial direction of the shaft 21. The ten permanent magnets 25 are magnetized so that a north pole and a south pole are arranged alternately in the circumferential direction centered at the shaft 21 of the rotor 20. Thus, the rotor 20 is constructed in a 10-pole configuration, and the motor 1 is constructed in a 10-pole and 12-slot configuration. The permanent magnets 25 are each a rare earth magnet or a ferrite magnet. The said rare earth magnet mainly contains a rare earth material, such as neodymium (Nd), iron (Fe), or boron (B).

The insulating resin portion 24 is produced by filling s gap between the smaller-radius iron core 22 and the larger-radius iron core 23 with an insulating resin material in injection molding. During the injection molding, the holes 22c provided in the smaller-radius iron core 22 and the holes 26c provided in the larger-radius iron core 23 are filled with a resin material for forming the insulating resin portion 24. The insulating resin portion 24 is used to unify the larger-radius iron core 23 and the smaller-radius iron core 22 by filling the gap between the smaller-radius iron core 22 and the larger-radius iron core 23 with the insulating resin in the injection molding, and at the same time, to provide electrical insulation between the larger-radius iron core 23 and the smaller-radius iron core 22. As the resin for forming the insulating resin portion 24, at least one of polybutylene terephthalate (PBT), liquid crystal plastic (LCP), and polyphenylenesulfide (PPS) can be used.

The pair of bearings 30 are disposed spaced apart from each other in the axial direction of the shaft 21. The pair of bearings 30 and 30 are disposed to interpose the smaller-radius iron core 22 of the stator 10 in the axial direction therebetween. Each of the bearings 30 and 30 includes: an inner ring 31 having a ring shape, which is fixedly attached to the outer peripheral surface of the shaft 21; an outer ring 32 having an inner diameter greater than the outer diameter of the inner ring 31, which is disposed coaxially with the inner ring 31; and rolling elements 33 rollably disposed between the inner ring 31 and the outer ring 32. One bearing 30 is configured such that the outer ring 32 is fixed on the plate portion 3 of the resin mold 2.

The insulating bracket 40 is formed of an insulating resin, and is formed in a disk shape. The insulating bracket 40 is fitted into the inside of the opening mouth 4a of the cylinder portion 4 of the resin mold 2. The opening mouth 4a of the cylinder portion 4 of the resin mold 2 is an opening formed under an end portion 10a of the stator 10 in the axial direction. The insulating bracket 40 fitted in the inside of the opening mouth 4a of the resin mold 2 includes a support 41 for supporting the outer ring 32 of the other bearing 30. In the first embodiment, the support 41 is a circular depressed portion provided on a surface of the insulating bracket 40, which faces the plate portion 3 of the resin mold 2, and receives therein and surrounds the outer ring 32 of the other bearing 30 to fit on the bearing.

The insulating bracket 40 is fixed on the bracket 50 by bolts 51 and nuts 52. The resin mold 2 is also fixed on the bracket 50 by the bolts 53 and the nuts 54.

In the rotor 20 of the motor 1 of the first embodiment, the larger-radius iron core 23 is constructed of the plurality of iron core blocks 26 in combination. Thus, for the rotor 20 of the motor 1, the sheet materials 26a for forming the iron core blocks 26 can be produced by pressing the metal bar material 26b in such an arrangement that the areas for the sheet materials 26a are in contact with each other at portions of the outer circumferences thereof as illustrated in FIG. 4. Accordingly, for the rotor 20 of the motor 1, a portion of the metal bar material 26b possibly becoming a waste material can be reduced, thereby allowing the yield of material of the larger-radius iron core 23 to be improved, and achieving cost reduction.

In addition, the rotor 20 of the motor 1 uses a material having an iron loss less than the material of the smaller-radius iron core 22, as a material for the larger-radius iron core 23 forming a magnetic path based on the permanent magnet 25, thereby making it possible to get the motor 1 having an improved efficiency. Furthermore, for the rotor 20 of the motor 1, the larger-radius iron core 23 is formed from an electromagnetic steel sheet, and the smaller-radius iron core 22 is formed from a sheet metal. Thus, the material cost of the smaller-radius iron core 22 can be reduced, and the cost can thus be reduced.

In the rotor 20 of the motor 1, the smaller-radius iron core 22 and the larger-radius iron core 23 are formed of a number of sheet materials 22a and 26a, respectively, and so it is possible to improve the yield of material, and realize cost reduction. In the rotor 20 of the motor 1, the axial length of the smaller-radius iron core 22 is shorter than the axial length of the larger-radius iron core 23, thereby making it possible to reduce the material cost of the smaller-radius iron core 22, and realize cost reduction. In the rotor 20 of the motor 1, the permanent magnets 25 is fixed on the outer peripheral surfaces of the iron core blocks 26 of the larger-radius iron core 23, thereby making it possible to realize the motor 1 having a low loss and a high efficiency.

In the rotor 20 of the motor 1, the gap between the smaller-radius iron core 22 and the larger-radius iron core 23, and the holes 22c and 26c are filled with a resin material for forming the insulating resin portion 24 in injection molding thereby to integrate together the smaller-radius iron core 22 and the larger-radius iron core 23. Accordingly, in the rotor 20 of the motor 1, since the larger-radius iron core 23 is formed into a ring shape based on a combination of the plurality of iron core blocks 26, the resin material for forming the insulating resin portion 24 flows into the gap between adjacent iron core blocks 26 when the smaller-radius iron core 22 and the larger-radius iron core 23 are formed integrally with each other by means of the insulating resin portion 24. In addition, in the rotor 20 of the motor 1, the outer ring 32 of the one bearing 30 is surrounded by the support 41 of the insulating bracket 40. As a result of this, the rotor 20 of the motor 1 can have a higher isolation property between the smaller-radius iron core 22 and the larger-radius iron core 23, thereby making it possible to reduce a current to flowing through the shaft 21, and prevent electrochemical corrosion of the bearing 30.

Although the first embodiment has been described on the assumption that the rotor 20 of the motor 1 is formed with the number of the iron core blocks 26 being equal to the number of the number of the permanent magnets 25 that is ten, the number of the iron core blocks 26 is not limited thereto, and one can choose any number for it. Moreover, the first embodiment has been described for an example in which the rotor 20 of the motor 1 includes the iron core blocks 26 each formed in a sector shape in cross section, but the shape of the iron core block 26 is not limited to a sector shape.

Second Embodiment

Figure 5:
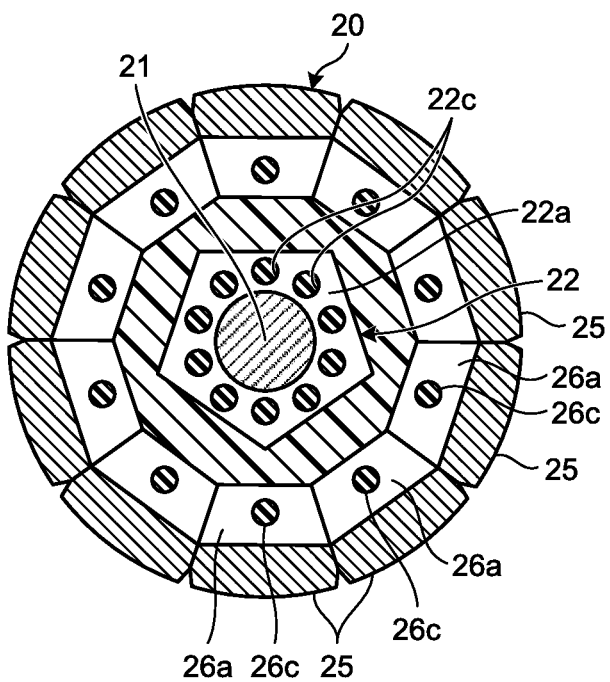
FIG. 5 is a transverse cross-sectional view, viewed perpendicularly to the shaft, of a motor rotor according to a second embodiment of the present invention.
Figure 6:
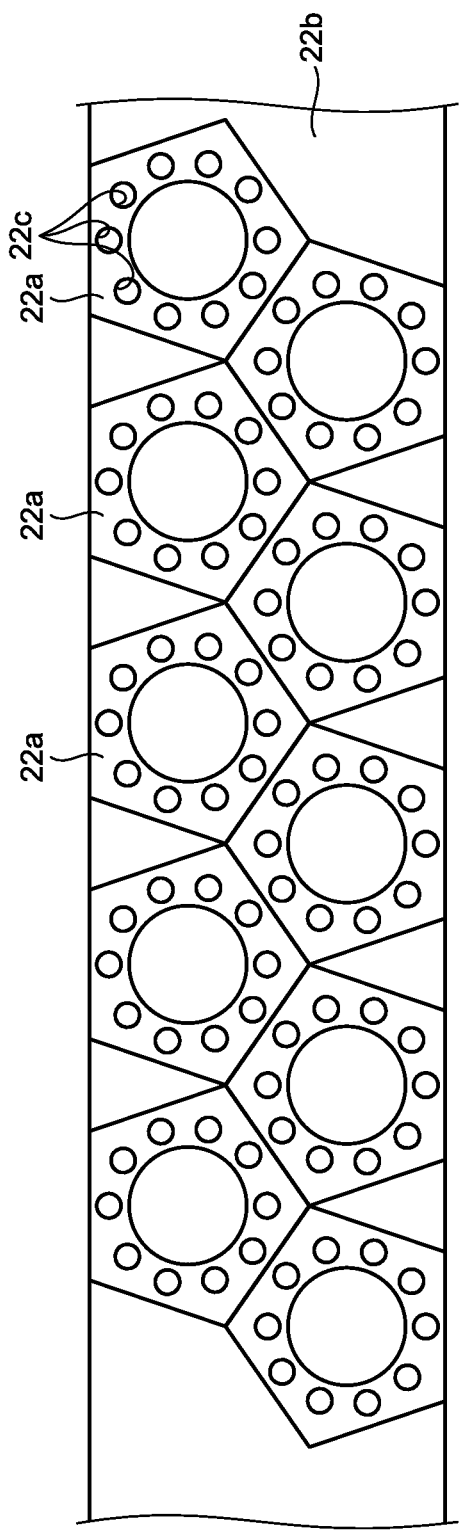
FIG. 6 is a plan view illustrating a metal bar material for forming sheet materials that constitute a smaller-radius iron core of the motor illustrated in FIG. 5.
Figure 7:
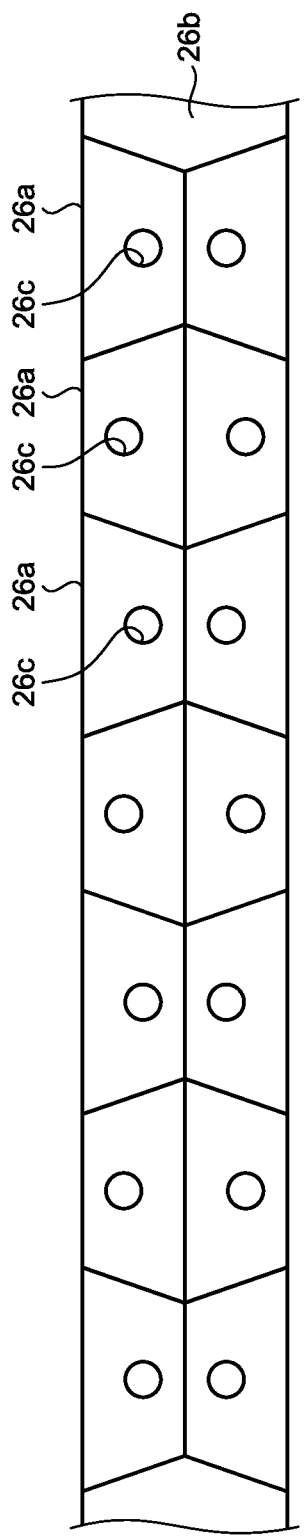
FIG. 7 is a plan view illustrating a metal bar material for forming sheet materials that constitute a larger-radius iron core of the motor illustrated in FIG. 5.

FIG. 5 is a transverse cross-sectional view, viewed perpendicularly to the shaft, of the motor rotor according to a second embodiment of the present invention. FIG. 6 is a plan view illustrating the metal bar material for forming the sheet materials for constituting the smaller-radius iron core of the motor illustrated in FIG. 5. FIG. 7 is a plan view illustrating the metal bar material for forming the sheet materials for constituting the larger-radius iron core of the motor illustrated in FIG. 5. In FIGS. 5 to 7, elements identical to those of the first embodiment are designated by like reference characters, and the explanation thereof will be omitted.

In the second embodiment, as illustrated in FIG. 5, the outer peripheral surface of the smaller-radius iron core 22 is formed in a polygonal shape in cross section perpendicular to the axis P, in the second embodiment, an equilateral pentagon. In other words, the cross-sectional shape, perpendicular to the axis P, of the outer peripheral surface of the smaller-radius iron core 22 is formed in a regular pentagon that is a polygonal shape. In the second embodiment, as illustrated in FIG. 5, the iron core blocks 26 of the larger-radius iron core 23 are each formed in a trapezoid in cross section perpendicular to the axis P. In the second embodiment, as illustrated in FIG. 5, the cross-sectional shape, perpendicular to the axis P, of the outer peripheral surface of the larger-radius iron core 23 is formed in an equilateral decagon that is a polygonal shape.

For the rotor 20 of the motor 1 of the second embodiment, the sheet materials 22a for forming the smaller-radius iron core 22 each have a regular pentagon shape in cross section. In this manner, as illustrated in FIG. 6, the sheet materials 22a can be produced by pressing the metal bar material 22b in such an arrangement that the outer circumferences of the sheet materials 22a coincide with each other in a center portion of the metal bar material 22b in a transverse direction of the metal bar material 22b, and the outer circumferences of the sheet materials 22a coincide with either outer edge of the metal bar material 22b. In addition, the rotor 20 of the motor 1 of the second embodiment uses the sheet materials 26a for forming the iron core blocks 26 of the larger-radius iron core 23, each of which has a trapezoid shape in cross section. By this way, as illustrated in FIG. 7, the sheet materials 26a can be produced by pressing the metal bar material 26b in such an arrangement that the outer circumferences of the sheet materials 26a coincide with each other, and the outer circumferences of the sheet materials 26a coincide with either outer edge of the metal bar material 26b. Accordingly, the rotor 20 of the motor 1 of the second embodiment can reduce wastes of the metal bar materials 22b and 26b, thereby allowing the yields of material of the metal bar materials 22b and 26b to be improved, and the cost to be reduced.

Third Embodiment

Figure 8:
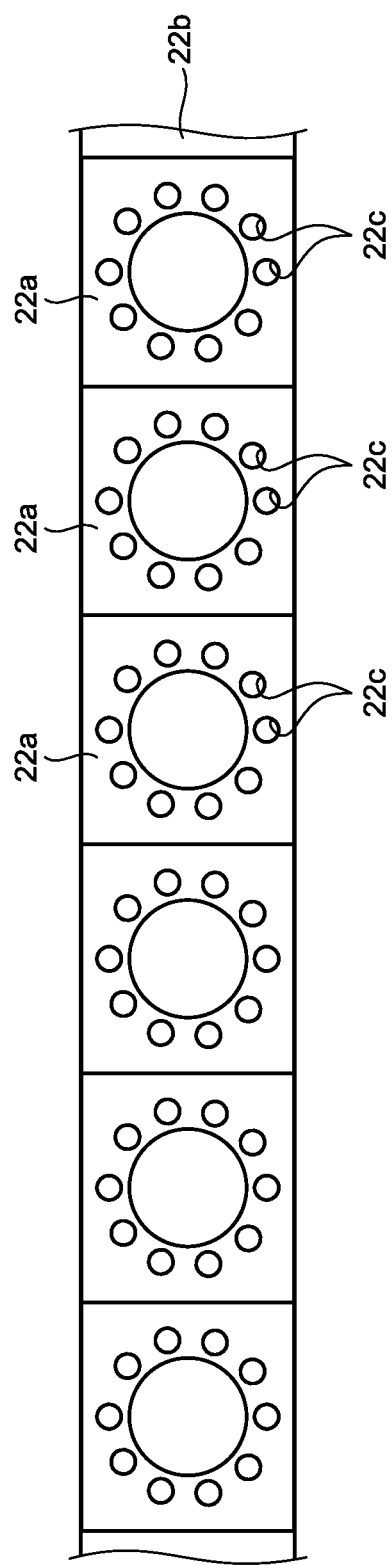
FIG. 8 is a plan view illustrating a metal bar material for forming sheet materials that constitute a smaller-radius iron core of a motor rotor according to a third embodiment of the present invention.

FIG. 8 is a plan view illustrating the metal bar material for forming the sheet materials for constituting the smaller-radius iron core of the motor rotor according to a third embodiment of the present invention. In FIG. 8, elements identical to those of the first and the second embodiments are designated by like reference characters, and the explanation thereof will be omitted.

In the third embodiment, the outer peripheral surface of the smaller-radius iron core 22 is formed in a polygonal shape in cross section perpendicular to the axis P, in the third embodiment, a square. In the rotor 20 of the motor 1 of the third embodiment, the sheet materials 22a for forming the smaller-radius iron core 22 are each formed in a square shape in cross section. In this manner, as illustrated in FIG. 8, the sheet materials 22a can be produced by pressing the metal bar material 22b in such an arrangement that the outer edges of the sheet materials 22a coincide with each other, and the outer edges of the sheet materials 22a coincide with either outer edge of the metal bar material 22b. Accordingly, the rotor 20 of the motor 1 of the third embodiment can reduce wastes of the metal bar material 26b, thereby allowing the yield of material of the metal bar material 22b to be improved, and the cost to be reduced.

Fourth Embodiment

Figure 9:
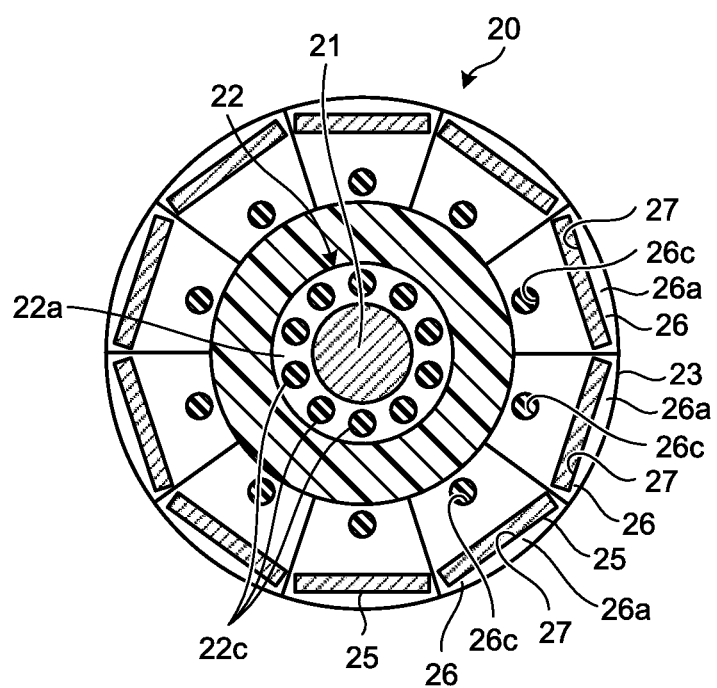
FIG. 9 is a transverse cross-sectional view, viewed perpendicularly to the shaft, of a motor rotor according to a fourth embodiment of the present invention.

FIG. 9 is a transverse cross-sectional view, viewed perpendicularly to the shaft, of the motor rotor according to a fourth embodiment of the present invention. In FIG. 9, elements identical to those of the first through the third embodiments are designated by like reference characters, and the explanation thereof will be omitted.

As illustrated in FIG. 9, the larger-radius iron core 23 of the rotor 20 of the motor 1 of the fourth embodiment has a plurality of magnet-housing holes 27 arranged spaced apart from each other in the circumferential direction about the shaft 21, in which the permanent magnets 25 are inserted. The rotor 20 of the motor 1 of the fourth embodiment has the magnet-housing hole 27 in each of the iron core blocks 26, the hole having therein a corresponding one permanent magnet 25 inserted. The permanent magnets 25 of the rotor 20 of the motor 1 of the fourth embodiment each have a plate shape having a constant thickness. The permanent magnets 25 each have a rectangular shape in cross section perpendicular to the shaft 21. The permanent magnets 25 are respectively housed in the magnet-housing holes 27 such that a transverse direction of the hole corresponds to the radial direction of the rotor 20, and the longitudinal direction of the hole is perpendicular to the radial direction of the rotor 20. That is, when housed in a magnet-housing hole 27, the permanent magnet 25 is positioned such that the widthwise direction of the permanent magnet 25 in cross section is along the radial direction of the rotor 20, and the longitudinal direction of the permanent magnet 25 in cross section is perpendicular to that widthwise direction. The magnet-housing holes 27 each extend straight in the longitudinal direction of the permanent magnet 25. The magnet-housing holes 27 each extend over the entire axial dimension of the iron core block 26. The rotor 20 of the motor 1 of the fourth embodiment has a number of magnet-housing holes 27 along a circumferential direction of the larger-radius iron core 23 centered at the shaft 21, and is configured such that the permanent magnets 25 are respectively embedded in the magnet-housing holes 27.

In the rotor 20 of the motor 1 of the fourth embodiment, one permanent magnet 25 is fixed on one iron core block 26, thereby making it possible to realize the motor 1 having a low loss and a high efficiency.

Fifth Embodiment

Figure 10:
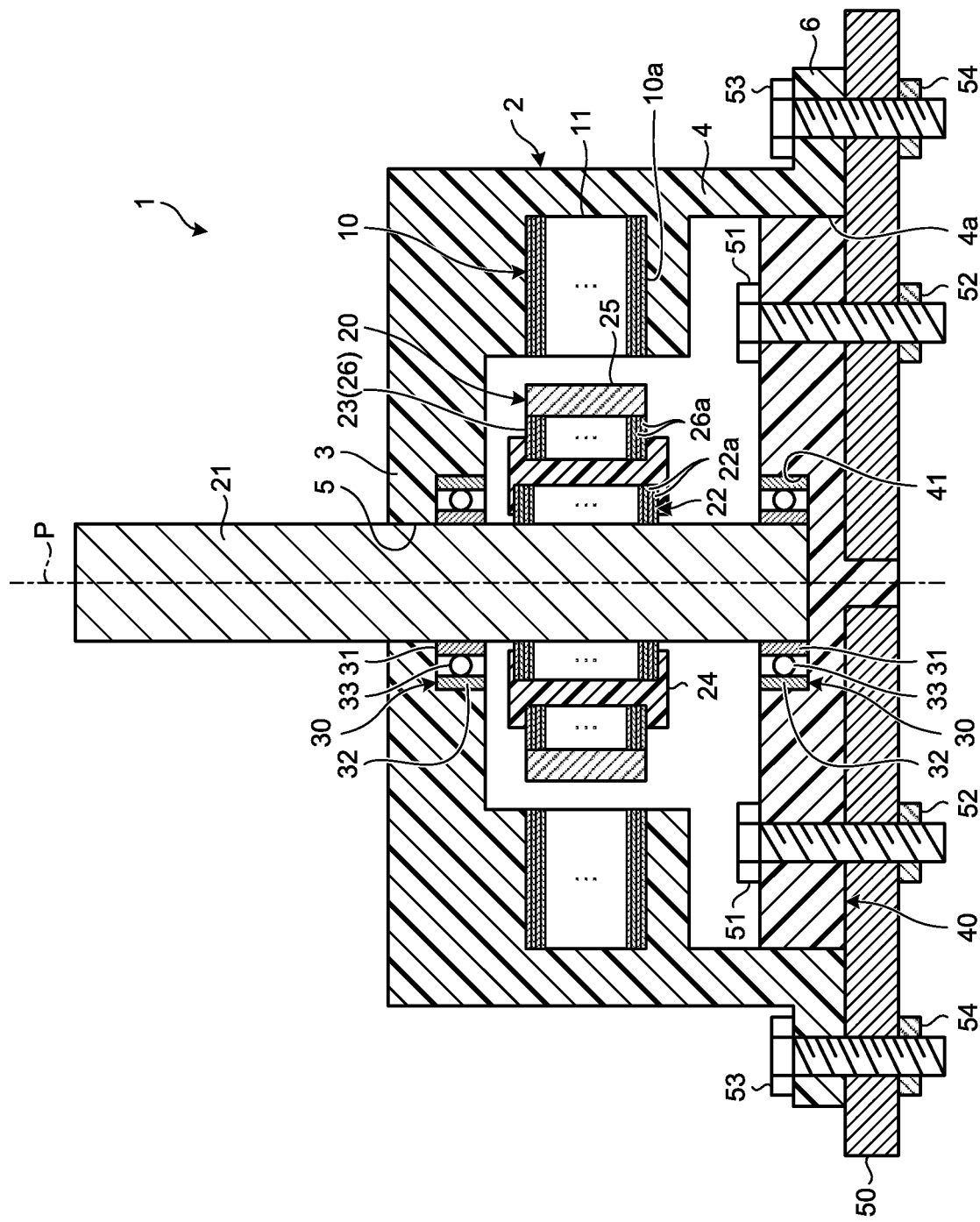
FIG. 10 is a longitudinal cross-sectional view of a motor according to a fifth embodiment.

FIG. 10 is a longitudinal cross-sectional view of the motor according to a fifth embodiment. In FIG. 10, elements identical to those of the first through the fourth embodiments are designated by like reference characters, and the explanation thereof will be omitted.

In the rotor 20 of the motor 1 of the fifth embodiment, the larger-radius iron core 23 has an axial length shorter than the axial length of the smaller-radius iron core 22. Thus, in the rotor 20 of the motor 1 of the fifth embodiment, since the larger-radius iron core 23 has an axial length shorter than the axial length of the smaller-radius iron core 22, the larger-radius iron core 23 can be made to have an iron loss less than the iron loss of the smaller-radius iron core 22. Accordingly, the rotor 20 of the motor 1 of the fifth embodiment enables the motor 1 to have a high efficiency. In addition, the rotor 20 of the motor 1 of the fifth embodiment enables the material cost of the larger-radius iron core 23 to be reduced, and thus the cost to be reduced.

Sixth Embodiment

Figure 11:
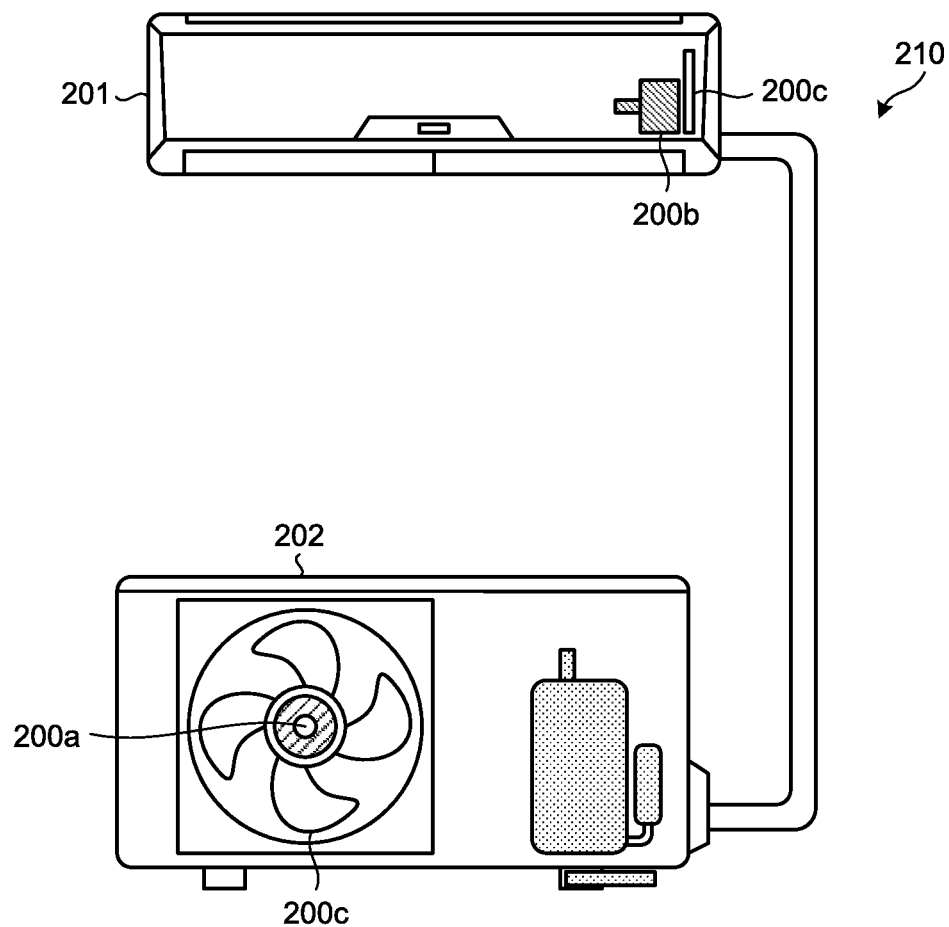
FIG. 11 is a diagram illustrating a configuration of a refrigeration air conditioner according to a sixth embodiment.

FIG. 11 is a diagram illustrating a configuration of a refrigeration air conditioner and a blower according to a sixth embodiment. As illustrated in FIG. 11, a refrigeration air conditioner 210 includes an indoor unit 201, and an outdoor unit 202 connected to the indoor unit 201. The outdoor unit 202 includes a blower 200a. The indoor unit 201 includes a blower 200b. At least one of the blowers 200a and 200b includes the motor 1 according to any of the first to the fifth embodiments, and a fan 200c rotated by the motor 1. In the sixth embodiment, both the blowers 200a and 200b include the motor 1 according to any of the first to the fifth embodiments, and the fan 200c rotated by the motor 1.

According to the sixth embodiment, the refrigeration air conditioner 210, and the blowers 200a and 200b each include the motor 1 according to any of the first to the fifth embodiments. Thus, the cost can be reduced.

Note that the motor 1 according to any of the first through the fifth embodiments may be incorporated in an electric apparatus other than an air conditioner, and such an electric apparatus is also advantageous similarly to the present embodiment.

The configurations described in the foregoing embodiments are merely examples of various aspects of the present invention. These configurations may be combined with other publicly known techniques, and partially omitted and/or modified without departing from the spirit of the present invention.

The invention claimed is:

1. A rotor of an electric motor comprising:
   a shaft;
   a first core fixed to an outer circumferential surface of the shaft;
   a second core formed in a ring shape by combining a plurality of core blocks, wherein the second core is disposed in a radial direction orthogonal to an axis of the shaft to be spaced apart from the first core and is disposed in a position having an axis common to the first core; and
   insulating resin that fixes the first core and the second core to each other,
   wherein first holes in which the insulating resin is filled are provided in the first core, and the first holes are surrounded by material forming the first core, and
   second holes in which the insulating resin is filled are provided in the second core, and the second holes are surrounded by material forming the second core.

2. The motor rotor according to claim 1, wherein a material for forming the second iron core and a material for forming the first iron core are different, and an iron loss of the material for forming the second iron core is less than an iron loss of the material for forming the first iron core.

3. The motor rotor according to claim 1, wherein the second iron core and the first iron core are each formed of a plurality of sheet materials stacked in a direction parallel to the axis.

4. The motor rotor according to claim 1, wherein a length of the first iron core in a direction parallel to the axis is shorter than a length of the second iron core in a direction parallel to the axis.

5. The motor rotor according to claim 1, wherein a length of the second iron core in a direction parallel to the axis is shorter than a length of the first iron core in a direction parallel to the axis.

6. The motor rotor according to claim 1, comprising: a permanent magnet fixedly attached to an outer peripheral surface of the second iron core, the permanent magnet forming a magnetic path with the second iron core.

7. The motor rotor according to claim 1, wherein a shape of an outer peripheral surface of the second iron core in cross section perpendicular to the axis is formed in a polygonal shape.

8. The motor rotor according to claim 1, wherein the second iron core has a plurality of magnet-housing holes arranged spaced apart from each other in a circumferential direction about the shaft, and in each of the magnet-housing holes a permanent magnet that forms a magnetic path with the second iron core is inserted.

9. The motor rotor according to claim 1, wherein a shape of an outer peripheral surface of the first iron core in cross section perpendicular to the axis is formed in a polygonal shape.

10. An electric motor comprising:
    a stator molded integrally with a resin mold section formed of resin;
    the rotor of the electric motor according to claim 1 disposed on an inner side of the stator;
    a bearing that rotatably supports the shaft of the rotor; and
    an insulating bracket formed of resin having insulation, fixed to an inner side of an opening formed at one end in a direction parallel to the axis of the resin mold section, and provided to surround an outer ring of the bearing.

11. A blower comprising:
    the electric motor according to claim 10; and
    a fan rotated by the electric motor.

12. A refrigeration air conditioner comprising:
    an indoor unit including a blower; and
    an outdoor unit connected to the indoor unit and including a blower,
    wherein at least one of the blower of the indoor unit and the blower of the outdoor unit includes the electric motor according to claim 10 and a fan rotated by the electric motor.

* * * * *